(12) United States Patent
Yonezawa et al.

(10) Patent No.: US 9,166,480 B2
(45) Date of Patent: Oct. 20, 2015

(54) INSULATION-TYPE POWER FACTOR CORRECTION CIRCUIT

(71) Applicant: FUJITSU LIMITED, Kawasaki-shi, Kanagawa (JP)

(72) Inventors: Yu Yonezawa, Sagamihara (JP); Yoshiyasu Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 244 days.

(21) Appl. No.: 13/961,635

(22) Filed: Aug. 7, 2013

(65) Prior Publication Data

US 2013/0322129 A1 Dec. 5, 2013

Related U.S. Application Data

(63) Continuation of application No. PCT/JP2011/053034, filed on Feb. 14, 2011.

(51) Int. Cl.
*H02M 3/335* (2006.01)
*H02M 3/28* (2006.01)
*H02M 1/42* (2007.01)
*H02M 1/34* (2007.01)

(52) U.S. Cl.
CPC ............ *H02M 3/285* (2013.01); *H02M 1/4258* (2013.01); *H02M 3/33569* (2013.01); *H02M 2001/342* (2013.01); *Y02B 70/126* (2013.01); *Y02B 70/1433* (2013.01); *Y02B 70/1491* (2013.01)

(58) Field of Classification Search
CPC ....................... H02M 3/33507; H02M 3/33546
USPC ................................................. 363/21.02, 97
See application file for complete search history.

(56) References Cited

U.S. PATENT DOCUMENTS

2013/0322129 A1* 12/2013 Yonezawa et al. ............... 363/20
2014/0056034 A1*  2/2014 Hyeon et al. ............... 363/21.02

FOREIGN PATENT DOCUMENTS

| JP | U58-3787 | 1/1983 |
| JP | U-58-3787 | 1/1983 |
| JP | U4-21186 | 2/1992 |
| JP | U4-43392 | 4/1992 |

(Continued)

OTHER PUBLICATIONS

Notification of Transmittal of Translation of the International Preliminary Report on Patentability (Form PCT/IB/338, Form PCT/IB/373 & Form PCT/ISA/237), PCT/JP2011/053034, 10 pages, dated Aug. 29, 2013.

(Continued)

*Primary Examiner* — Jeffrey Sterrett
(74) *Attorney, Agent, or Firm* — Fujitsu Patent Center

(57) ABSTRACT

This is an insulation-type power factor correction circuit including a resonance unit configured to accumulate energy of a surge occurring when the first switching element is turned off and to transmit a resonance current generated by resonating the first capacitor and the primary winding of the second transformer from the primary winding of the second transformer to the secondary winding, a rectifier unit configured to rectify a resonance current output from the resonance unit, a smoothing unit configured to regenerate power output from the rectifier unit to an output of the insulation-type power factor correction circuit, and a control unit configured to control a first switching element for each cycle.

8 Claims, 14 Drawing Sheets

(56) References Cited

FOREIGN PATENT DOCUMENTS

| JP | A10-191632 | 7/1998 |
| JP | 11-178341 | 7/1999 |
| JP | 11-318075 | 11/1999 |
| JP | A2002-58249 | 2/2002 |

OTHER PUBLICATIONS

International Search Report, mailed in connection with PCT/JP2011/053034 and mailed May 10, 2011.

* cited by examiner

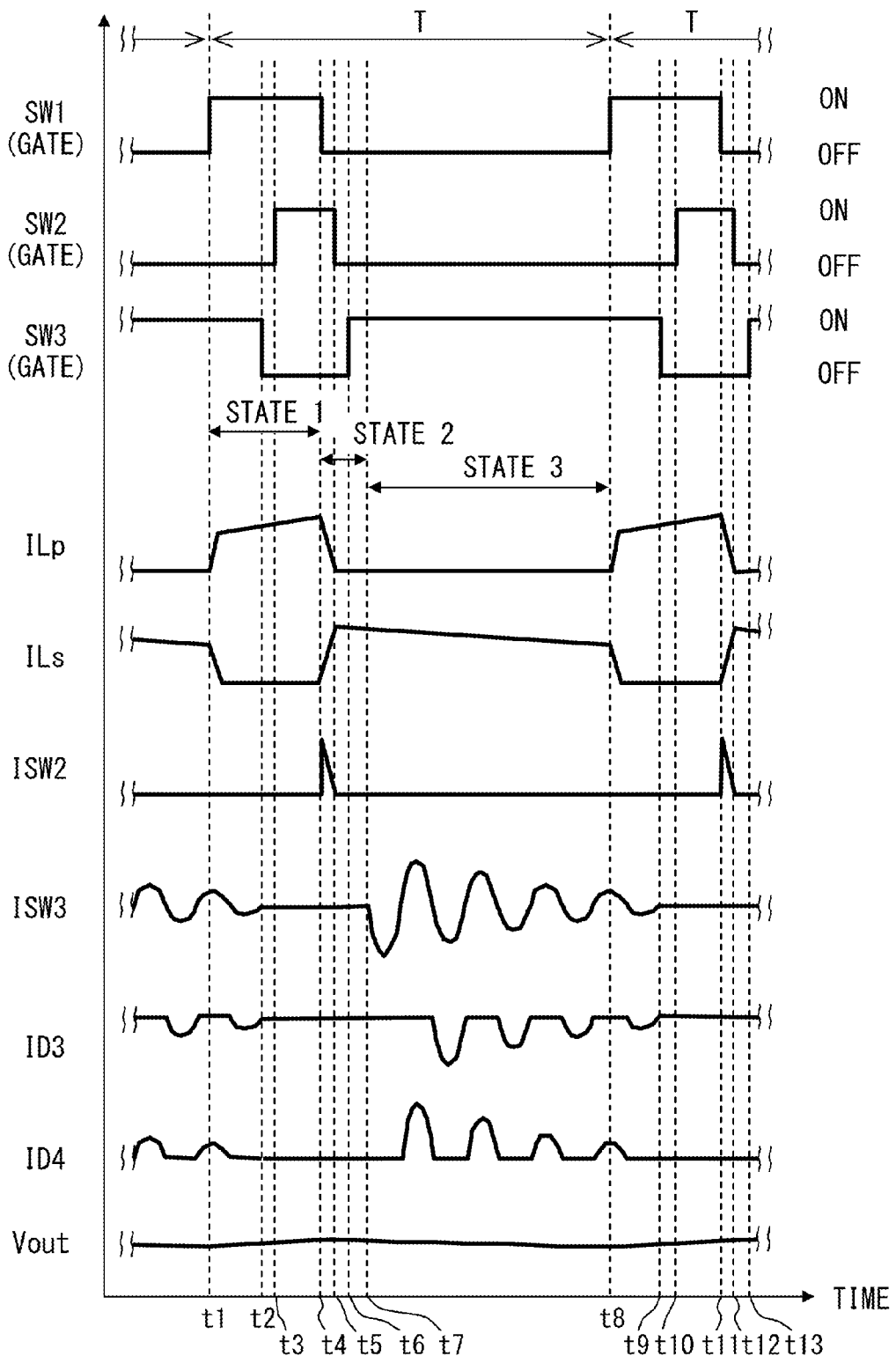
F I G. 3

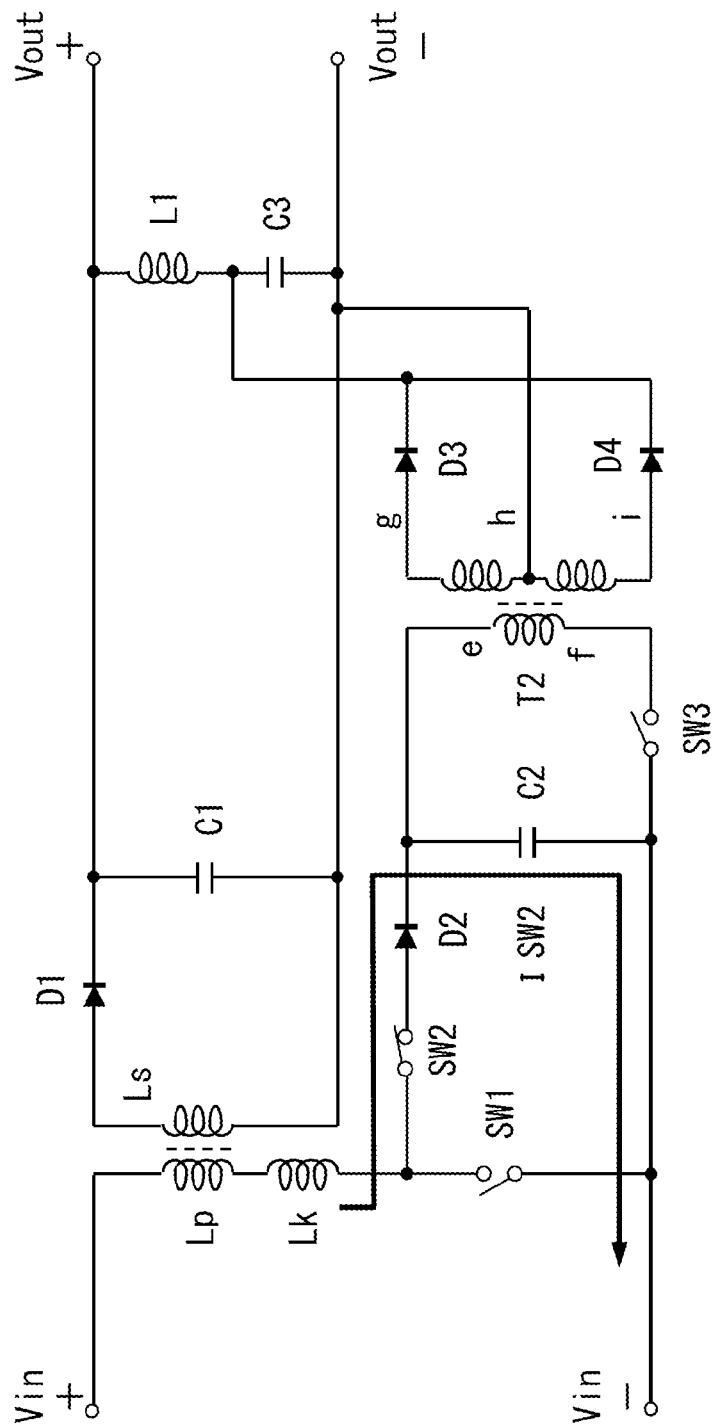
F I G. 5

| | 91 |
|---|---|
| INPUT VOLTAGE VALUE | Vin |
| OUTPUT VOLTAGE VALUE | Vout |
| ⋮ | ⋮ |
| STARTING TIME OF SW1 | t1 |
| DRIVING PERIOD OF SW1 | t4-t1 |
| DELAY TIME OF SW2 | t (SW2-ON-Delay) |
| BLOCKAGE TIME OF SW2 | t (SW2-OFF-shadan) |
| STARTING TIME OF SW2 | t3-t1 |
| DRIVING PERIOD OF SW2 | t5-t1 |
| DEAD TIME 1 OF SW3 | d1 |
| DEAD TIME 2 OF SW3 | d2 |
| STARTING TIME OF SW3 | t2-t1 |
| DRIVING PERIOD OF SW3 | t6-t1 |

FIG. 9

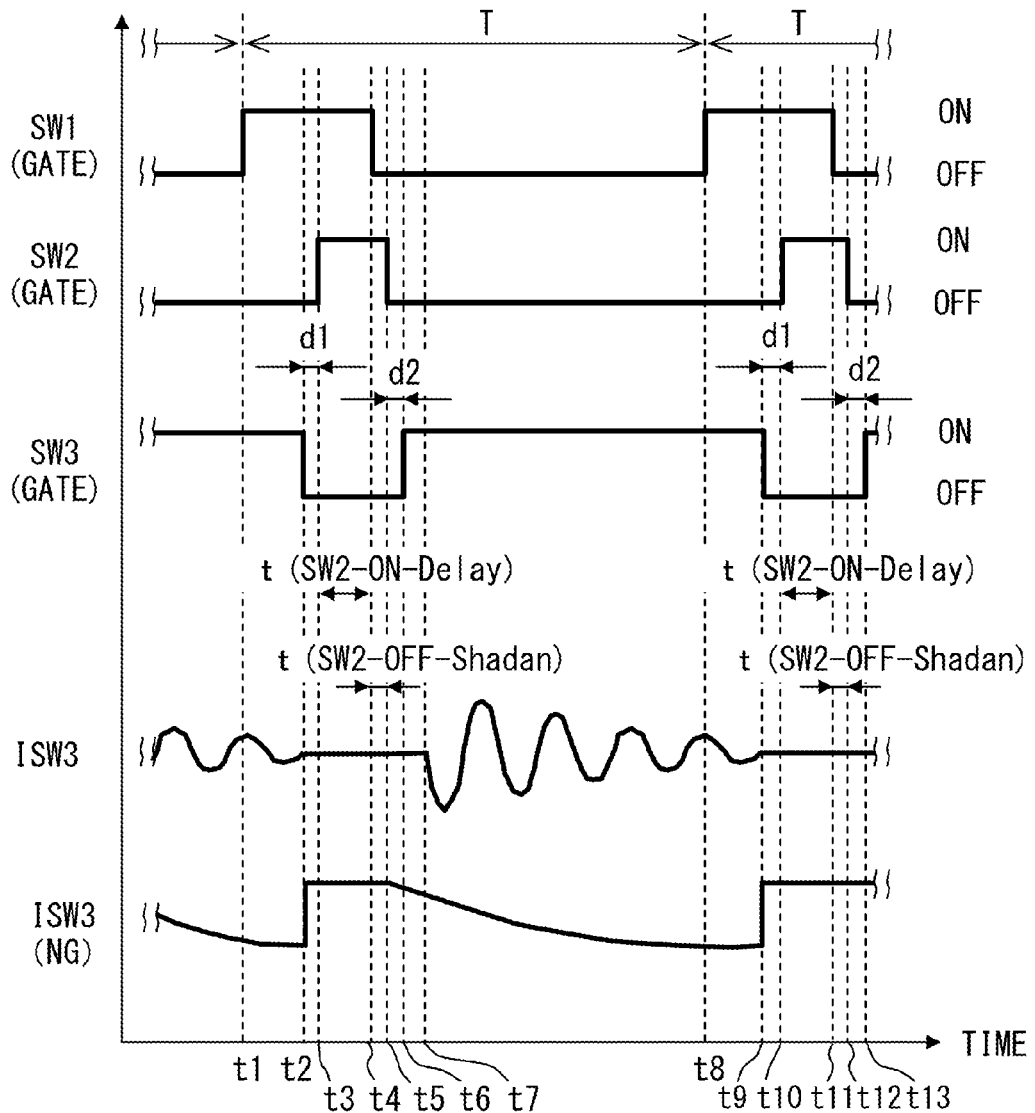
F I G. 11

INSULATION-TYPE POWER FACTOR CORRECTION CIRCUIT

CROSS-REFERENCE TO RELATED APPLICATION

This application is a continuation application of International Application PCT/JP2011/053034 filed on Feb. 14, 2011 and designated the U.S., the entire contents of which are incorporated herein by reference.

FIELD

The embodiments discussed herein are related to an insulation-type power factor correction circuit.

BACKGROUND

It is known that power factor correction (PFC) circuits are used as, for example, active filters for reducing harmonic distortion caused in a DC input/DC output power supply (DC-DC conversion circuit). However, because PFC circuits are not insulated from AC lines, there is a possibility that fatal accidents will occur, such as for example electrification, which may be caused when a human body touches electric currents between the output voltage of a PFC circuit and the ground, or such as electrical leakage between devices. Accordingly, DC-DC conversion circuits of an insulation type have conventionally been provided in a stage later than PFC circuits. However, DC-DC conversion circuits of an insulation type use transformers for transmitting electric power, resulting in a low efficiency (input power/output power) and complexity in circuit configurations.

Accordingly, it is desired that PFC circuits be insulated. However, because a transformer is used for insulation, a high surge voltage is caused by the leakage inductance of the transformer when the field effect transistor (FET) connected to the primary side of the transformer is turned off. Also, a high-voltage FET that can withstand the surge voltage has to be used, leading to a higher cost for FETs. Also, a high-voltage FET suffers from strong ON-resistance, which causes more losses and a reduction in the efficiency. Also, when a snubber circuit is used on the primary side of a transformer so as to suppress a surge voltage, resistors in the snubber circuit cause power losses, reducing the efficiency in DC-DC conversion circuits of an insulation type.

For example, a switching power supply device that reduces noise and switching losses caused by soft switching and that also regenerates, when a switching element is turned on, energy accumulated in a charge accumulation capacitor when the switching element is turned off is known. According to this switching power supply device, when a switching element is turned on, an auxiliary switching element is turned on first. Next, the auxiliary switching element is turned on during a period of one fourth of the resonance period between the capacitance of the charge accumulation capacitor and the inductance of the primary winding of the charge regeneration transformer so as to transmit the energy accumulated in the charge accumulation capacitor to the transformer. When the auxiliary switching element is turned off, the energy accumulated in the charge regeneration transformer flows into the DC input power supply via the charge regeneration diode. As a result of this, the entirety of the losses is reduced and higher frequencies are realized.

Also, for example, a transformer insulation DC-DC converter that includes a diode, a resonation capacitor, primary winding and an auxiliary capacitor of an auxiliary transformer, and secondary winding and a diode of an auxiliary transformer is known. The diode has its one terminal connected to the connection point between the first winding of the transformer and the transistor. The resonation capacitor is connected between the other terminal of the diode and the cathode terminal of the DC power supply. The primary winding and auxiliary transistor of the auxiliary transformer are connected in series between the anode terminal and the cathode terminal of the DC power supply. When the auxiliary transistor is turned on or turned off simultaneously with the transistor, and when the auxiliary transistor is turned on, the discharge energy of the resonance capacitor is regenerated to the DC power supply through the auxiliary transformer and the diode. As a result of this, the switching losses and noise in the transformer insulation DC-DC converter are reduced and the efficiency is improved.

Patent Document 1: Japanese Laid-open Patent Publication No. 11-178341

Patent Document 2: Japanese Laid-open Patent Publication No. 11-318075

SUMMARY

An insulation-type power factor correction circuit according to an aspect of the embodiments includes a first switching element that is connected in series to a primary winding of a first transformer and a control unit that corrects a power factor by performing on/off control on the first switching element in each cycle. Also, the insulation-type power factor correction circuit includes a circuit that rectifies and smoothes a current transmitted from the primary winding to the secondary winding of the first transformer.

A resonance unit connected to the first switching element in parallel includes a first capacitor that accumulates energy of a surge occurring when the first switching element is turned off, a second switching element provided between the primary winding of the first transformer and the first capacitor. Also, the resonance unit includes a second transformer connected in parallel to the first capacitor.

A rectifier unit rectifies the resonance current output from the resonance unit.

A smoothing unit regenerates power output from the rectifier unit, to an output of the insulation-type power factor correction circuit.

A control unit turns on the second switching element at a time before the first switching element is turned off when energy of a surge occurring when the first switching element is turned off is accumulated in the first capacitor, and connects the primary winding of the first transformer, in each of the cycles.

The control unit turns off the second switching element at a time after the first switching element is turned off so as to cause the resonance current by resonating the primary winding of the second transformer and the first capacitor, transmits the energy accumulated in the first capacitor from the primary winding of the second transformer to the secondary winding, and makes the rectifier unit output the energy, in each of the cycles.

The object and advantages of the invention will be realized and attained by means of the elements and combinations particularly pointed out in the claims.

It is to be understood that both the forgoing general description and the following detailed description are exemplary and explanatory and are not restrictive of the invention, as claimed.

BRIEF DESCRIPTION OF DRAWINGS

FIG. 3 illustrates an example of operation waveforms of respective units of the PFC circuit;

FIG. 5 illustrates a state in which energy of a leakage inductor is accumulated in capacitor C2;

FIG. 9 illustrates an example of a data configuration of SW information;

FIG. 11 illustrates an example of operation waveforms of respective units of the PFC circuit;

DESCRIPTION OF EMBODIMENTS

Figure 1:
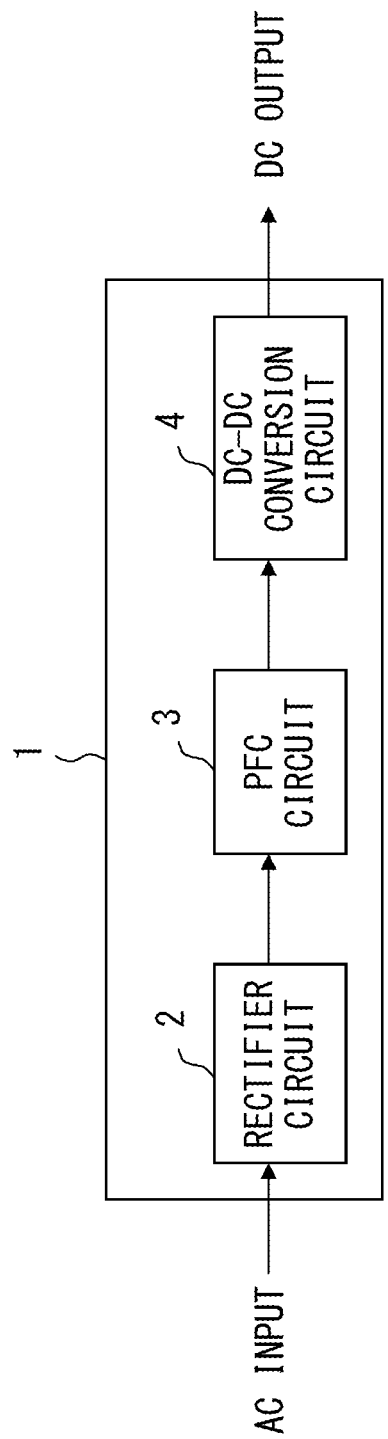
FIG. 1 is a block diagram illustrating an example of a power-supply unit.

Hereinafter, detailed explanations will be given for embodiments by referring to the drawings.

In embodiment 1, in order to suppress a surge voltage occurring in the leakage inductor on the primary side of the transformer provided in an insulation-type power factor correction circuit, a circuit configured to transmit the energy of a surge to the secondary side of the transformer is provided. That circuit regenerates the energy of a surge to an output, and improves the efficiency of the insulation-type PFC circuit.

Embodiment 1 will be explained.

In embodiment 1, explanations will be given by using a PFC circuit provided in a power-supply unit illustrated in FIG. 1. FIG. 1 is a block diagram illustrating an example of a power-supply unit. A power-supply unit 1 illustrated in FIG. 1 includes a rectifier circuit 2, a PFC circuit 3, and a DC-DC conversion circuit 4. In this example, the power-supply unit 1 is used for, for example, an information apparatus such as a server, a personal computer, etc. However, the scope of application of the power-supply unit 1 is not limited to an information apparatus, and it is possible to apply the power-supply unit 1 to an apparatus that uses an AC-input-DC-output power source (AC-DC conversion circuit).

The rectifier circuit 2 rectifies an alternating current into a pulsating current, which flows to a consistent direction. For the rectifier circuit 2, a diode bridge, for example, may be used. The DC-DC conversion circuit 4 converts a DC voltage output from the PFC circuit 3 into a prescribed DC voltage.

The PFC circuit 3 decreases distortion in an input current caused by a smoothing capacitor provided on a stage later than the rectifier circuit 2 and the PFC circuit 3 by making the distortion become close to the sine wave. Also, it is possible to reduce noise and primary winding distribution loss by providing the PFC circuit 3.

Figure 2:
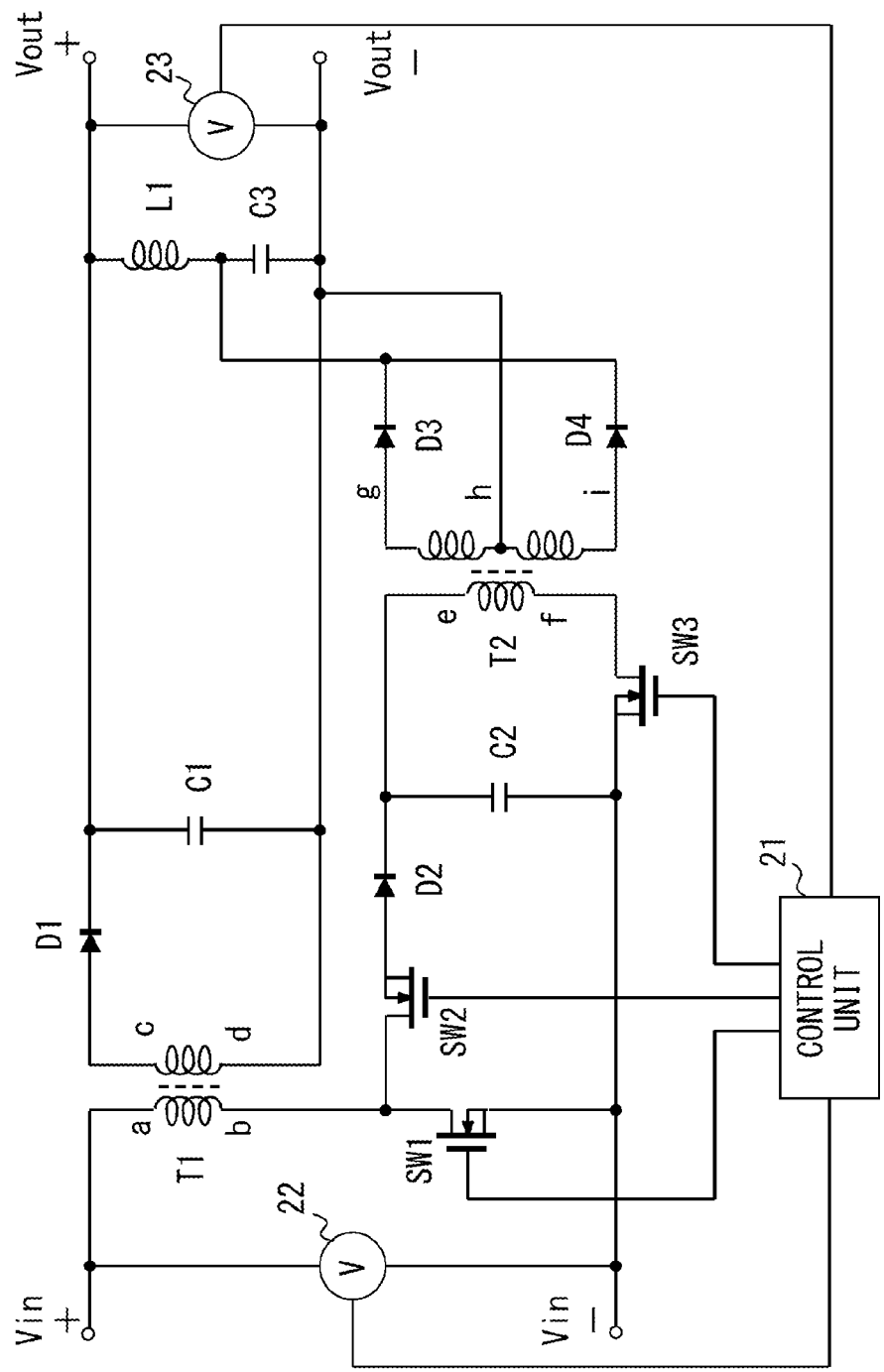
FIG. 2 illustrates an example of a PFC circuit according to embodiment 1.

FIG. 2 illustrates an example of the PFC circuit in embodiment 1. The PFC circuit 3 illustrated in FIG. 2 includes transformer T1 (first transformer), diode D1, capacitor C1, switching element SW1 (first switching element), a control unit 21, a resonation unit, a rectifier unit, and a smoothing unit. The control unit 21 controls switching element SW1 periodically. In this example, the PFC circuit 3 includes capacitor C1.

The resonance unit accumulates, in capacitor C2, the energy of a surge occurring when switching element SW1 is turned off, and transmits a resonance current generated by resonating capacitor C2 and the primary winding of transformer T2 from the primary winding to the secondary winding of transformer T2. The resonance unit includes switching element SW2 (second switching element), switching element SW3 (third switching element), diode D2 (first diode), capacitor C2 (first capacitor), and transformer T2 (second transformer).

The rectifier unit rectifies a resonance current output from the resonance unit. The resonance unit includes diode D3 (second diode) and diode D4 (third diode).

The smoothing unit regenerates power output from the rectifier unit to the output of the PFC circuit 3. The smoothing unit includes inductor L1 and capacitor C3 (second capacitor).

A voltmeter 22 measures a voltage input to the PFC circuit 3, and outputs the result to the control unit 21. The voltmeter 23 measures a voltage output from the PFC circuit 3, and outputs the result to the control unit 21. The voltmeters 22 and 23 may be any device that is capable of measuring voltages and outputting the measurement results to the control unit 21.

Transformer T1 is a transformer for insulating the PFC circuit 3. Also, for transformer T1, a coupled inductor may be used. Diode D1 is a rectifier diode or the like. Capacitor C1 is a smoothing capacitor or the like. Switching element SW1 may be, for example, a Metal-Oxide-Semiconductor Field-Effect Transistor (MOSFET), an Insulated Gate Bipolar Transistor (IGBT), or the like. FIG. 2 illustrates a case when a MOSFET is used as switching element SW1.

Switching elements SW2 and SW3 may be, for example, a MOSFET, IGBT, or the like. FIG. 2 illustrates a case in which a MOSFET is used as switching element SW1. Note that although switching elements SW2 and SW3 have the same withstand voltage value as that of switching element SW1, allowable currents may be made to be smaller for them. Diodes D2 through D4 are rectifier diodes or the like. Capacitor C2 is a capacitor or the like. Transformer T2 generates resonance by the capacitor C2 and the primary winding of the transformer T2, and transmits the resonance current to the secondary winding side of transformer T2. Inductor L1 and capacitor C3 constitute an LC smoothing circuit (smoothing unit).

The control unit 21 obtains input voltage value Vin, which was measured by the voltmeter 22 for each cycle T and which corresponds to a voltage output from the rectifier circuit 2, and output voltage value Vout, which was measured by the voltmeter 23 for each cycle T and which corresponds to a voltage output from the PFC circuit 3. Next, the control unit 21 generates control signals respectively corresponding to switching elements SW1 through SW3 by using input voltage value Vin and output voltage value Vout. Control signals will be described later. For control signals, Pulse Width Modulation (PWM) signals may be used.

In the generating of a control signal by switching element SW1, a target output voltage value is obtained by using, for example, PI control or PID control for each cycle T. Next, the control unit 21 obtains, on the basis of the target output voltage value, a period in which a voltage is applied to the gate terminal of switching element SW1 for each cycle T. The obtained period is reflected in the control signal of switching element SW1 in the next cycle T. For example, a voltage is applied to the gate terminal of switching element SW1 during the period obtained from the starting time of period T. In other words, the control signal is maintained in an ON state during a period obtained from the starting time of period T.

Control of switching element SW1 may use a current mode. When a current mode is used, a current meter for measuring a current of the PFC circuit 3 is provided, and the control unit 21 obtains a target output current value by using respective measurement results by the voltmeters 22 and 23 and the current meter. Next, the control unit 21 obtains, on the basis of the target output current value, a period (driving period) in which a voltage is applied to the gate terminal of switching element SW1 for each period T. The obtained driving period is reflected in the control signal of switching element SW1 in the next cycle T. For example, a voltage is applied to the gate terminal of switching element SW1 during the driving period that starts at the starting time of period T. In other words, the control signal is maintained in an ON state during a period obtained from the starting time of period T. Note that control of the switching element SW1 is not limited to the two types of control that have been described above. Also, it is possible to use, as a driving period, the starting time and the ending time of a period in which the control signal is in an ON state.

The generating of control signals of switching elements SW2 and SW3 will be explained later. Also, for the control unit 21, a central Processing Unit (CPU) or a programmable device (Field Programmable Gate Array (FPGA), Programmable Logic Device (PLD), or the like) may be used.

Also, the control unit 21 illustrated in FIG. 2 includes a driving unit and a recording unit. The driving unit generates driving signals corresponding to switching elements SW1 through SW3 by amplifying control signals respectively corresponding to switching elements SW1 through SW3 output from the control unit 21, and inputs the generated driving signals to the gate terminals of respective switching elements SW1 through SW3. The driving unit may be provided separately from the control unit 21. The recording unit records setting data such as period T, a target output voltage value, and the like, and input data such as input voltage value Vin and output voltage value Vout. Also, calculation data related to a driving period of switching element SW1 in period T of switching element SW1 obtained by the control unit 21, driving periods of switching elements SW2 and SW3, and the like are recorded. The recording unit may be provided separately from the control unit 21.

A circuit configuration of the PFC circuit 3 will be explained.

One of the terminals (terminal a in FIG. 2) on the primary winding side of transformer T1 is connected to one of the output terminals (+terminal) of the rectifier circuit 2. The other terminal (terminal b in FIG. 2) on the primary winding side of transformer T1 is connected to the drain terminal of switching element SW1 and the drain terminal of switching element SW2. One of the terminals (terminal c in FIG. 2) on the secondary winding side of transformer T1 is connected to the anode terminal of diode D1. The cathode terminal of diode D1 is connected to one of the output terminals of the PFC circuit 3 and one of the terminals of capacitor C1. The other terminal (terminal d in FIG. 2) on the secondary winding side of transformer T1 is connected to the other output terminal of the PFC circuit 3, the other terminal of capacitor C1, and the other terminal of capacitor C3. The other terminal of inductor L1 and the other terminal of capacitor C3 are connected. The other output terminal (−terminal) of the rectifier circuit 2 is connected to the source terminal of switching element SW1, the source terminal of switching element SW3, and the other terminal of capacitor C2. The source terminal of switching element SW2 is connected to the anode terminal of diode D2. The cathode terminal of diode D2 is connected to one of the terminal capacitor C2 and one of the terminal (terminal e) on the primary winding side of transformer T2. The other terminal (terminal f) on the secondary winding side of transformer T2 is connected to the drain terminal of switching element SW3. One of the terminals (terminal g) on the secondary winding side of transformer T2 is connected to the anode terminal of diode D3. The cathode terminal of diode D3 and the cathode terminal of diode D4 are connected to the other terminal of inductor L1 and the other terminal of capacitor C3. The other terminal (terminal i) on the secondary winding side of transformer T2 is connected to the anode terminal of diode D4. The middle terminal (terminal h) on the secondary winding side of the transformer T2 is connected to the other output terminal of the PFC circuit 3.

Operations of PFC circuit 3 will be explained by referring to FIGS. 3, 4, 5, and 6.

Figure 4:
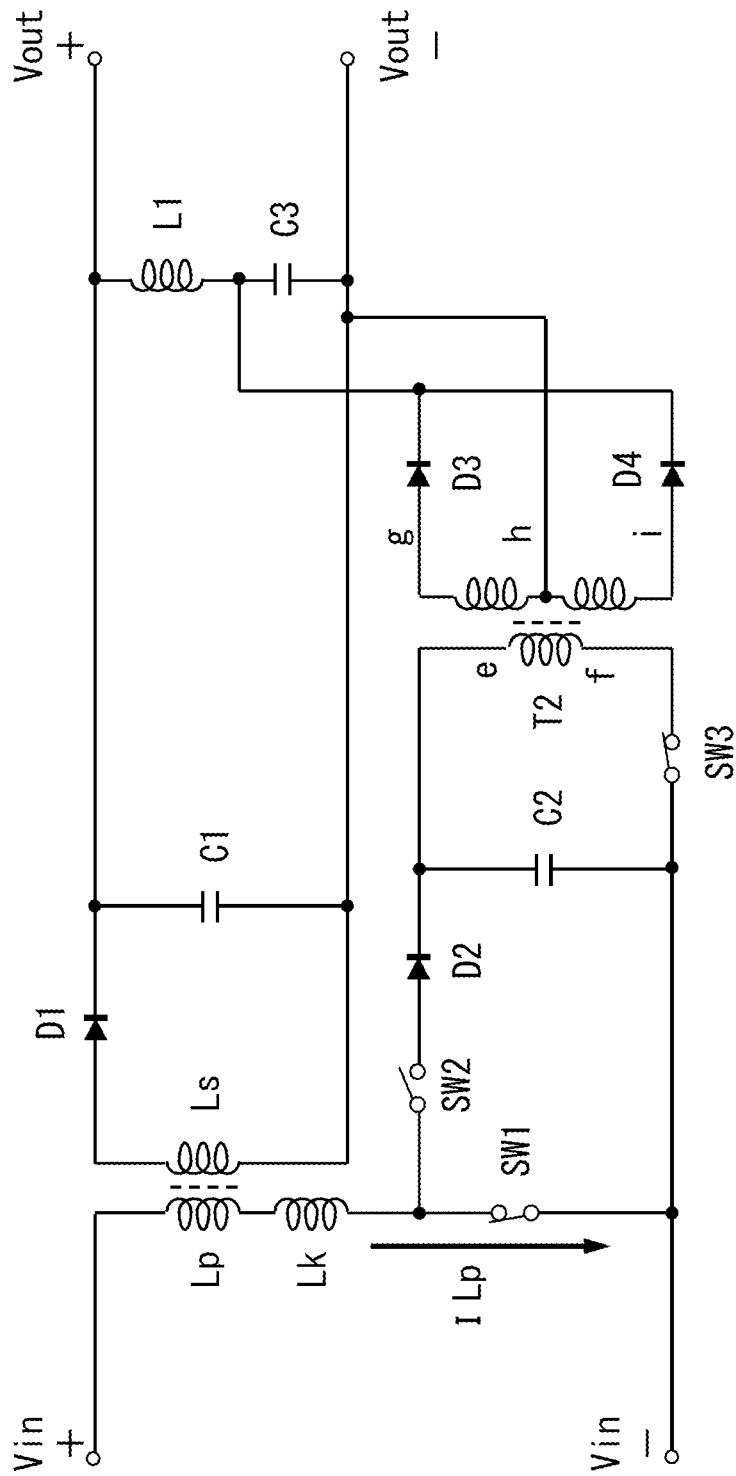
FIG. 4 illustrates a state in which a current is flowing to the primary side of transformer T1.
Figure 6:
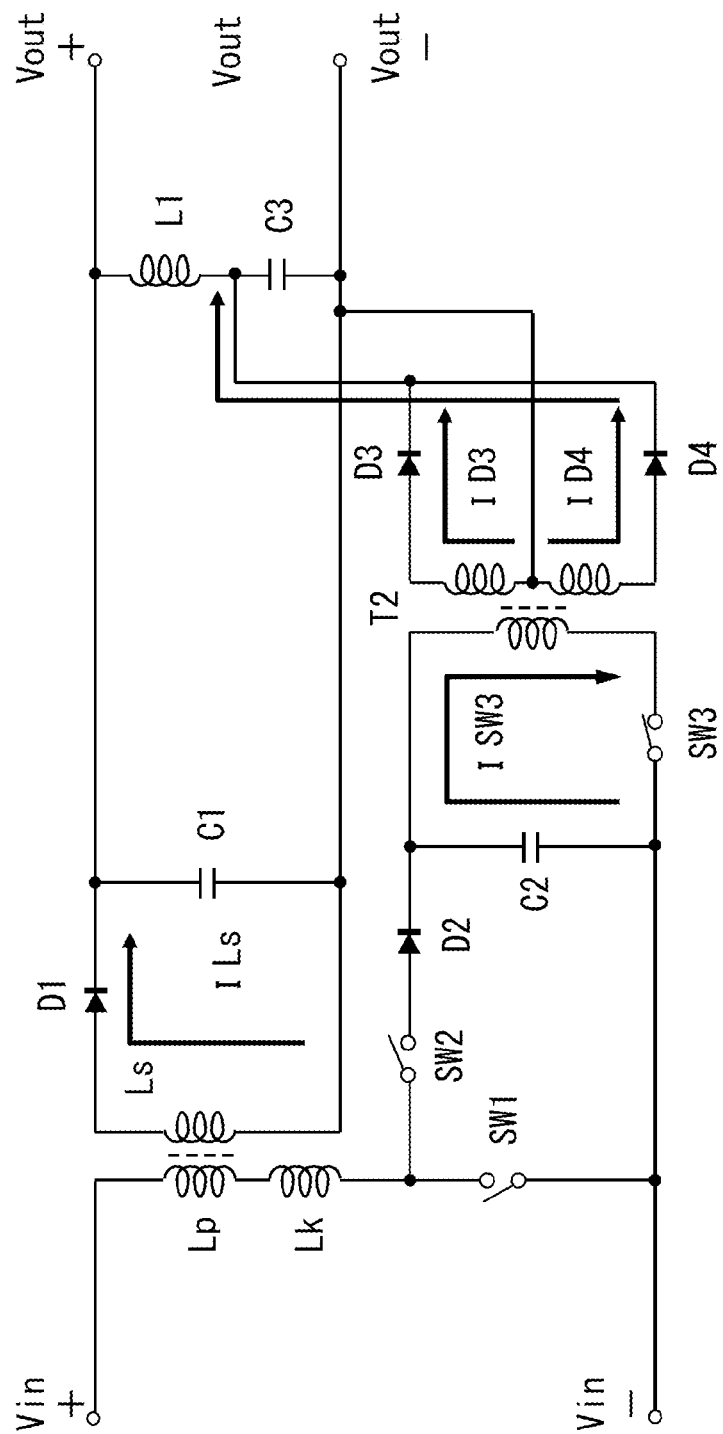
FIG. 6 illustrates a state in which a resonance current that was transmitted to the secondary side of transformer T2 has been regenerated to a current transmitted to the secondary side of transformer T1.

FIG. 3 illustrates an example of operation waveforms of respective units of the PFC circuit. FIG. 4 illustrates a state in which a current is flowing to the primary side of transformer T1. FIG. 5 illustrates a state in which energy of the leakage inductor is accumulated in capacitor C2. FIG. 6 illustrates a state in which a resonance current that was transmitted to the secondary side of transformer T2 has been regenerated to a current transmitted to the secondary side of transformer T1. FIG. 4 through FIG. 6 each illustrate leakage inductors Lk for convenience. Also, switch SW1 is illustrated as switching element SW1, switch SW2 is illustrated as switching element SW2, and switch SW3 is illustrated as switching element SW3.

In the example illustrated in FIG. 3, waveform SW1 of a driving signal input to the gate terminal of switching element SW1 (gate) and waveform SW2 (gate) of a driving signal input to the gate terminal of switching element SW2 are illustrated. Also, waveform SW3 (gate) of a driving signal input to the gate terminal of switching element SW3 is illustrated. "ILp" in FIG. 3 represents the waveform of a current flowing to the primary side of transformer T1 and "ILs" represents the waveform of a current flowing to the secondary side of transformer T1 in FIG. 3. "ISW2" in FIG. 3 represents the waveform of a current flowing between the drain and the source of switching element SW2, and "ISW3" represents the waveform of a current flowing to switching element SW3. "ID3" represents the waveform of a current flowing to diode D3, and "ID4" represents the waveform of a current flowing to diode D4 in FIG. 3. "Vout" in FIG. 3 represents output voltage value Vout of the PFC circuit 3.

State 1 in FIG. 3 (period t1-t4) will be explained.

At timing t1, a driving signal output from the control unit 21 to switching element SW1 (first control signal) is turned on, a voltage is applied to the gate terminal of switching element SW1, and the switching element SW1 is turned on from an off state. Thereafter, current ILp flows to the primary side of transformer T1. As illustrated in FIG. 4, switching element SW1 (represented as "switch SW1" in FIG. 4) is turned on (becomes conductive) so that current ILp flows. At this moment, because switching element SW2 (represented as "switch SW2" in FIG. 4) is blocked, a current does not flow to the side of transformer T2. Also, switching element SW3 (represented as "switch SW3" in FIG. 4) has been turned on.

At timing t2 (the off time for the third switching element), a driving signal (third control signal) output from the control unit 21 to switching element SW3 is turned off from an ON state, and switching element SW3 is turned off. The timing at which a driving signal of switching element SW3 is turned off is earlier than timing t3, at which a driving signal (second control signal) of switching element SW2 is turned on. It is desirable that the timing be, for example, earlier than t3 of the turn-on period (period t3-t4) of switching element SW2 illustrated in FIG. 3 and simultaneous with or earlier than t2 of the dead time (period t2-t3). At timing t2, switching element SW1 (switch SW1) is turned on (becomes conductive) so that current ILp flows while switching element SW2 (switch SW2) is blocked, and accordingly, a current does not flow to the side of transformer T2.

At t3 (the on time of the second switching element), a driving signal output from the control unit 21 to switching element SW2 is turned on, a voltage is applied to the gate terminal of switching element SW2, and the switching element SW2 is turned on from an off state. The timing at which a driving signal of switching element SW2 is turned on is earlier than timing t4, at which a driving signal of switching element SW1 is turned off. It is desirable that the timing earlier than t4 be, for example, timing t3, which is the starting point of the turn-on period (period t3-t4) of switching element SW2 illustrated in FIG. 3. Also, it is desirable that timing t4, which is the ending point of the turn-on period (period t4-t5), be timing t4, which is the starting point of the turn-off period. Also, although at timing t3, switching element SW1 (switch SW1) is turned on (becomes conductive) so that current ILp flows, a current does not flow to the side of transformer T2 until switching element SW2 (switch SW2) is turned on.

At timing t4, a driving signal of switching element SW1 output from the control unit 21 is turned off and switching element SW1 is turned off. Also, switching element SW2 (switch SW2) is turned on so that the state becomes a state in which a current may flow to the side of transformer T2. As illustrated in FIG. 5, switching element SW1 (switch SW1) is turned off (blocked) and switching element SW2 (switch SW2) is turned on so that a current flows to the side of transformer T2.

State 2 in FIG. 3 (period t4-t7) will be explained.

When switching element SW1 is turned off and switching element SW2 is turned on at timing t4, the energy of leakage inductor Lk is accumulated in capacitor C2 until t5 of the turn off period (period t4-t5) of switching element SW1. As depicted by the waveform of current ISW2 flowing in switching element SW2 in period t4-t5 as illustrated in FIG. 3, the energy of leakage inductor Lk is accumulated in capacitor C2. During the turn-off period of switching element SW1, current ISW2 flows as illustrated in FIG. 5.

At timing t5 (the off time for the second switching element), a driving signal of switching element SW2 output from the control unit 21 is turned off and switching element SW2 is turned off from an ON state. Timing t5 is a timing at which the turn-off period (period t4-t5) of switching element SW1 ends.

At timing t6 (the on time for the third switching element), a driving signal of switching element SW3 output from the control unit 21 is turned on and switching element SW3 is turned on from an off state. The timing at which a driving signal of switching element SW3 is turned on is a timing later than timing t5, at which a driving signal of switching element SW2 is turned off. It is desirable that the timing be, for example, later than t5 of the turn-on period (period t5-t6) of switching element SW2 and simultaneous to or later than t6 of the dead time (period t5-t6) illustrated in FIG. 3.

Timing t7 is a timing after the turn-on period (period t6-t7) of switching element SW3 has elapsed. After the elapsing, switching element SW3 is turned on from an off state, and current ISW3 flows as illustrated in FIG. 6.

State 3 (period t7-t8) illustrated in FIG. 3 will be explained.

At timing t7, current ILs flows to the secondary side of transformer T1, and resonance ISW3 is generated on the primary side of transformer T2 so that the resonance current is transmitted to the secondary side of transformer T2 as illustrated in FIG. 6. Thereafter, as illustrated in FIG. 6, the resonance current is rectified by the rectifier circuit, and ripples of currents ID3 and ID4 are reduced by the LC smoothing circuit including the inductor L1 and capacitor C3, and currents ID3 and ID4 are regenerated.

In this configuration, in order to regenerate the energy of the surge, the voltage to be regenerated has to be higher than output voltage value Vout. Accordingly, the winding ratio of transformer T2 is higher than that of transformer T1. In other words, the winding ratio of transformer T2 (=(the number of secondary wires of transformer T1)/(the number of primary wires of transformer T1)) is made to be greater than the winding ratio of transformer T1 (=(the number of secondary wires of transformer T1)/(the number of primary wires of transformer T1)). As a result of this, the regenerated voltage is higher than output voltage value Vout. In the example of the circuit illustrated in FIG. 1, the winding ratio of (the number of wires between g and h on the secondary side of transformer T2)/(the number of primary wires of transformer T2) and the winding ratio of (the number of wires between h and i on the secondary side of transformer T2)/(the number of primary wires of transformer T2) are made to be higher than the winding ratio of transformer T1.

At timing t8, the operation transitions to operations in next cycle T, and control of switching elements SW1 through SW3 corresponding to next cycle T is performed.

Control by the control unit 21 will be explained.

Figure 7:
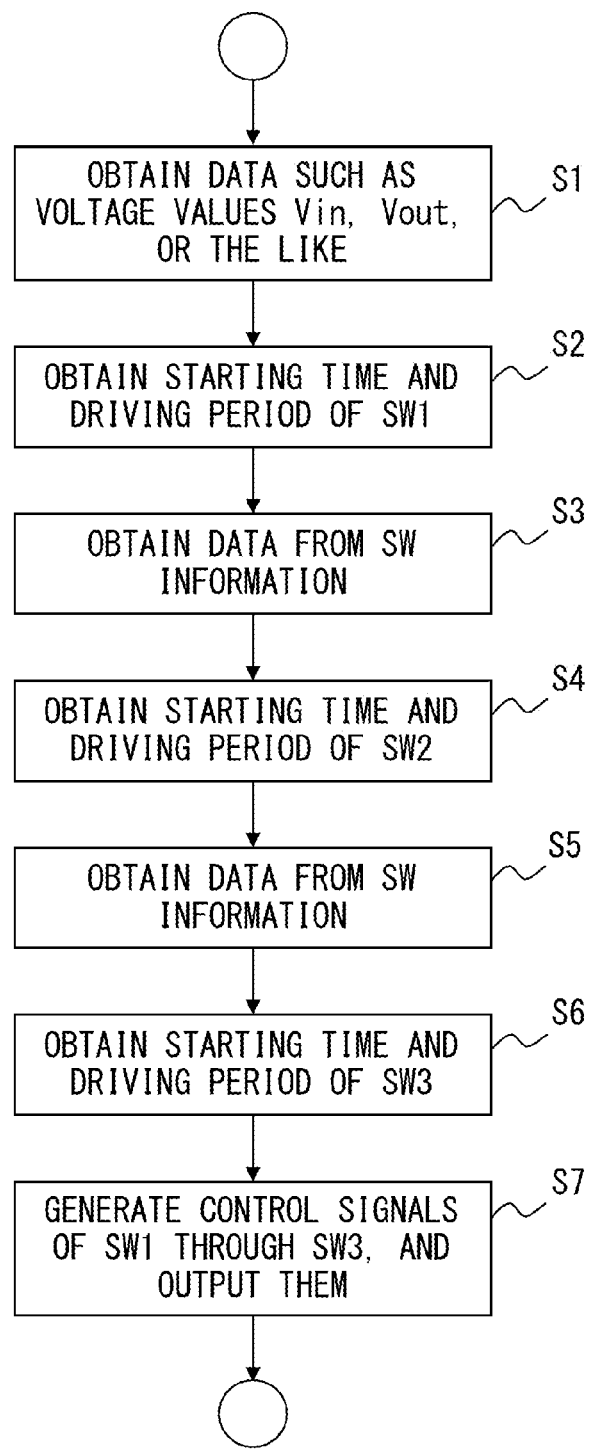
FIG. 7 is a flowchart illustrating an example of operations by a control unit.

FIG. 7 is a flowchart illustrating an example of operations by the control unit. In step S1, data used by the control unit 21 for controlling switching element SW1 such as input voltage value Vin, output voltage value Vout, or the like is obtained. Input voltage value Vin corresponds to a voltage output from the rectifier circuit 2, and output voltage value Vout corresponds to a voltage output from the PFC circuit 3. Input voltage value Vin and output voltage value Vout are sampled in, for example, each cycle T, and are recorded in a recording unit. In the example illustrated in FIG. 8, it is possible to obtain such data at timings t1 and t8.

Figure 8:
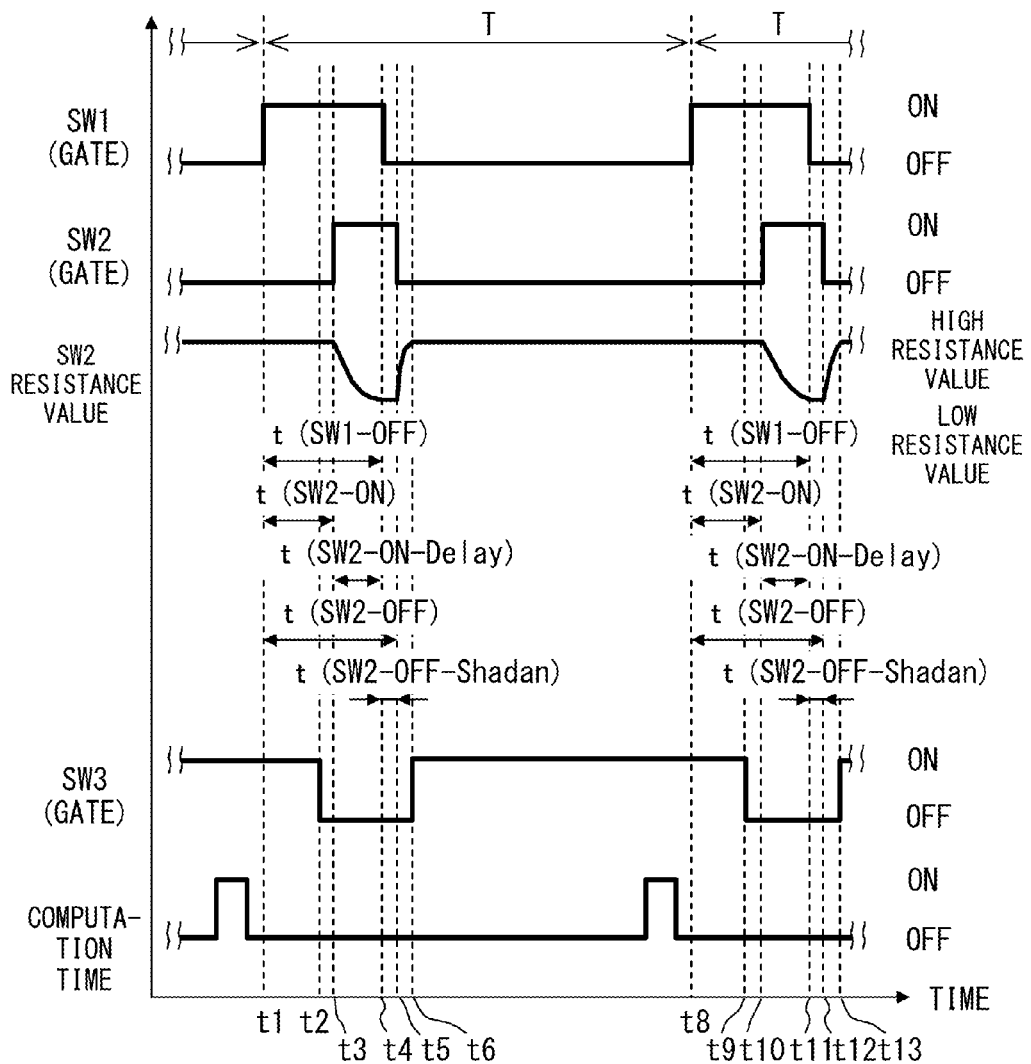
FIG. 8 illustrates an example of delay time for turning on switching element SW2.

FIG. 8 illustrates an example of a delay time for turning on switching element SW2. In FIG. 8, waveform SW1 (gate) of a driving signal input to the gate terminal of switching element SW1 and waveform SW2 (gate) of a driving signal input to the gate terminal of switching element SW2 are illustrated in order from the top. The waveform of the resistance value of switching element SW2 is depicted for the SW2 resistance value. Also, waveform SW3 (gate) of a driving signal input to the gate terminal of switching element SW3 is depicted. For the waveforms of computation time in FIG. 8, times for obtaining the control timings of switching elements SW1 through SW3 in each cycle T are depicted.

Also, input voltage value Vin and output voltage value Vout are recorded in SW information 91 illustrated in FIG. 9. SW information 91 in FIG. 9 is used for controlling driving signals (or the first through third control signals) for controlling the switching element SW1 through SW3. FIG. 9 illustrates an example of a data configuration of SW information. SW information records input data, setting data, calculation data, etc. In step S1, the control unit 21 records "Vin" and "Vout" as "input voltage value" and "output voltage value", respectively, as input data. Also, a setting value for generating a driving signal corresponding to switching element SW1 (not illustrated in FIG. 9) is recorded.

In step S2, the starting time and the driving period (termination time) of switching element SW1 is obtained by the control unit 21. In other words, a control signal is generated for controlling the gate terminal of switching element SW1 in next cycle T. The starting time and the driving period of switching element SW1 is obtained with the waveform of the computation time being in an ON state in the example in FIG. 8. Computation times of starting times and driving periods may be any values as long as they are within cycle T, and are not limited particularly. Also, the driving period of switching element SW1 in FIG. 8 is a period t1-t4 and period t8-t11. Next, the control unit 21 records, in the recording unit, data related to the obtained starting time and driving period of switching element SW1. For example, the starting time and the driving period of switching element SW1 are recorded in SW information 91 illustrated in FIG. 9. In the example illustrated in FIG. 9, "t1" and "t4-t1" are recorded as "starting time of SW1" and "driving period of SW1", respectively. Although "t1-t4" is recorded as "driving period of SW1" in the present example, "t4" may be recorded. In other words, when a starting time is determined on an assumption that t1 is zero seconds, the time elapsed between t1 and t4 is the termination time, and accordingly "t4" may be recorded.

In step S3, the control unit 21 obtains from SW information 91 data used for controlling switching element SW2. In the example illustrated in FIG. 8, data is obtained with the waveform of the computation time being in an ON state. "Data used for controlling switching element SW2" used in the present example is data associated with "starting time of SW1", "driving period of SW1", "delay time of SW2", and "blockage time of SW2". "Delay time of SW2" is recorded as delay time when switching element SW2 is turned on. "Blockage time of SW2" is recorded as a time used for turning off a driving signal output to the switching element SW2. The time is obtained by using Equation 1, which will be explained later. In the present example, "t(SW2–ON–Delay" is recorded in such a manner that it is associated with "delay time of SW2" in SW information 91 in FIG. 9. "t(SW2–OFF)" is recorded in such a manner that it is associated with "blockage time of SW2".

In step S4, the control unit 21 obtains the starting time of switching element SW2 (the on time for the second switching element) and the driving period (the off time for the second switching element). In other words, a control signal is generated for controlling the gate terminal of switching element SW2 in next cycle T. The starting time and the driving period of switching element SW2 is obtained with the waveform of the computation time being in an ON state in the example in FIG. 8. Computation times of starting times and driving periods may be any values as long as they are within cycle T, and are not limited particularly. Also, the driving period of switching element SW2 in FIG. 8 is a period t3-t5 and period t10-t12. Next, the control unit 21 records in the recording unit data related to the obtained starting time and the driving period of switching element SW2. For example, the starting time and the driving period of switching element SW2 are recorded in SW information 91 illustrated in FIG. 9. The SW information 91 in FIG. 9 records data used for generating a control signal to be output to the gate terminal of switching element SW3. In the example illustrated in FIG. 9, "t3–t1" and "t5–t1" are recorded as "starting time of SW2" and "driving period of SW2" in SW information 91, respectively. As the starting time, "t3–t1" is recorded as "starting time of SW2" in the present example. In other words, when t3 is treated as the starting time of switching element SW2 on the basis of an assumption that starting time t1 of cycle t is zero seconds, a time after the time between t1 and t3 has elapsed is the starting time. As "driving period of SW2", "t5–t1" is recorded as the termination time in the present example. In other words, when t5 is treated as the termination time of switching element SW2 based on an assumption that starting time t1 of cycle t is zero seconds, a time after the time between t1 and t5 has elapsed is the termination time.

Explanations will be given for a method of obtaining the starting time and the driving period of switching element SW2. In order to transmit, to the secondary side, the energy of a surge generated by a leakage inductor of transformer T1 provided in an insulation-type PFC circuit transmit so as to regenerate it to the output, switching element SW2 is turned on immediately before switching element SW1 is turned off. When a delay time t(SW2–ON–Delay) accompanying the turning on of switching element SW2 is considered, it is desirable that switching element SW2 be turned on at the time represented by Equation 1. In other words, by delaying as much as possible the time at which switching element SW2 is turned on, a time during which switching element 3 can operate is maximized and a time for regenerating energy is set to be the maximum. As a result of this, the on time of switching element SW3 can be maintained at the maximum, making it possible to extend a time of regenerating the energy. Accordingly, the starting time of switching element SW2 is obtained by using Equation 1.

$$t(SW2\text{–ON}) = t(SW1\text{–OFF}) - t(SW2\text{–ON–Delay}) \quad \text{(Equation 1)}$$

t(SW2–ON) in Equation 1 represents the starting time of switching element SW2, and corresponds to t3 and t10 in FIG. 8. t(SW1–OFF) in Equation 1 represents a driving period (termination time) of switching element SW1, and corresponds to t4 and t11 in FIG. 8. t(SW1–OFF) is data that was obtained in step S2 and is recorded in "driving period of SW1".

t(SW2–ON–Delay) in Equation 1 represents a delay time caused when switching element SW2 is turned on. A delay time will be explained by referring to FIG. 8. A delay time corresponds to periods t3-t4 and t10-t11. In FIG. 8, after a driving signal has been input to the gate terminal of switching element SW2, the resistance value of switching element SW2 becomes smaller and a current flows to the switching element SW2, and thereafter switching element SW2 is turned on. A time before this turning on is treated as a delay time.

Calculation data t(SW2–ON) obtained above is recorded as "starting time of SW2" in SW information 91.

Next, a driving period (termination time) of switching element SW2 will be explained.

Figure 10:
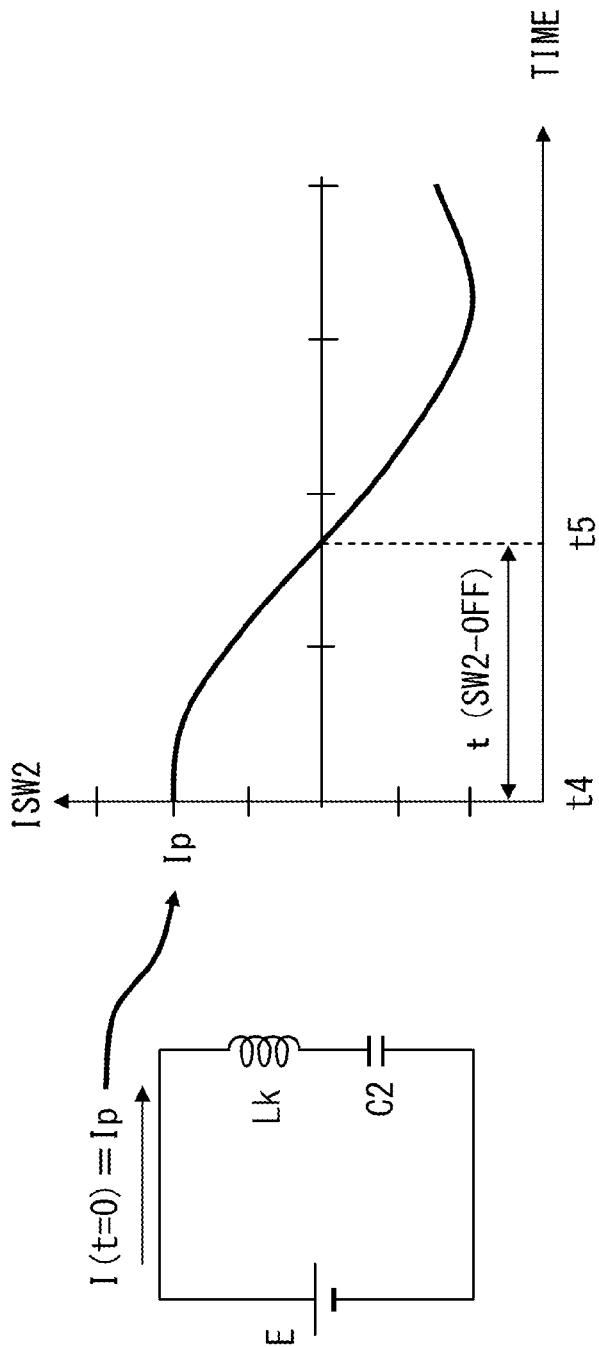
FIG. 10 illustrates a circuit and a graph for explaining a blockage time of switching element SW2.

The timing of turning off a driving signal of switching element SW2 is a timing after a driving signal of switching element SW1 is turned off. The driving period (termination time) of switching element SW2 is obtained by using Equation 2.

$$t(SW2\text{–OFF}) = t(SW1\text{–OFF}) + t(SW2\text{–OFF–Shadan}) \quad \text{(Equation 2)}$$

t(SW2–OFF) in Equation 2 represents a termination time of switching element SW2, and corresponds to t5 and t12 in FIG. 8. t(SW1–OFF) in Equation 2 represents a driving period (termination time) of switching element SW1, and corresponds to t4 and t11 in FIG. 8. t(SW1–OFF) is data that was obtained in step S2 and is recorded as "driving period of SW1".

t(SW2–OFF–Shadan) in Equation 2 represents a turn-off time occurring when switching element SW2 is turned off. It is desirable that a timing of turning off switching element SW2 be later than a timing after the energy of the leakage inductor has been transferred to capacitor C2. In other words, blockage occurs at the moment when a charging current to capacitor C2 has become zero. FIG. 10 illustrates a circuit and a graph for explaining a blockage time of switching element SW2. As illustrated in FIG. 10, the energy of a primary winding Lp of transformer T1 is all transmitted to the secondary side as illustrated in FIG. 10, and accordingly the blockage time of switching element SW2 can only be obtained by considering leakage inductor Lk. In other words, it is desirable that, as illustrated in the graph in FIG. 10, the driving signal of switching element SW2 be turned off at timing t5, at which the charging current to capacitor C2 becomes zero from t4 (the driving signal of switching element SW1 is off). The timing (t5) at which the current of capacitor C2 after the timing (t4) at which the driving signal of switching element SW1 has been turned off is represented by Equation 3.

$$t(SW2\text{-}OFF\text{-}Shadan) = \sqrt{Lk \times C2} \times \tan^{-1}\left(\pi - Ip\frac{\sqrt{Lk/C2}}{E}\right) \quad \text{(Equation 3)}$$

Lk, C2, Ip, and E in Equation 3 are recorded in the recording unit. Lk represents the inductance value of a leakage inductor. C2 represents the capacitance value of capacitor C2. Ip represents the peak current value estimated on the primary side of transformer T1. E represents input voltage value Vin. t(SW2-OFF-Shadan) represents a period between timing t4, at which the driving signal of secondary winding SW1 is turned off, and timing t5. In the example in FIG. 9, setting data t(SW2-OFF-Shadan), obtained by using Equation 2, is recorded as "blockage time of SW2". Although (SW2-OFF-Shadan) is recorded in the present example, it is also possible to obtain t(SW2-OFF-Shadan) in each cycle T by recording Lk, C2, Ip, and E in Equation 2.

Next, in step S4, the control unit 21 records the timing of turning off the driving signal of switching element SW2 in "driving period of SW2". In the present example, "t5−t1" is recorded as calculation data t(SW2-OFF) obtained above.

Explanations will be given for the setting of capacitor C2.

In the setting of a surge value occurring in switching element SW1 to arbitrary voltage Vs, the value of capacitor C2 is determined by using Equation 4.

$$C2 = Lk(Ip^2/Vs^2) \quad \text{(Equation 4)}$$

Ip(ISW2) in Equation 4 represents primary-side peak current (t=0) of transformer T1, and Vs represents the maximum value of the surge voltage of switching element SW2. t=0 represents a time during which the energy has not been transferred from leakage inductor Lk to capacitor C2.

According to Equation 4, energy ULk accumulated in leakage inductor Lk when the primary-side peak current of transformer T1 is Ip can be represented by using Equation 5.

$$ULk = (½) \times Lk \times Ip^2 \quad \text{(Equation 5)}$$

Energy ULk is all transferred to capacitor C2 by resonance with capacitor C2 in each resonance cycle. Energy UC2 of capacitor C2 can be represented by Equation 6.

$$UC2 = (½) \times C2 \times Vs^2 \quad \text{(Equation 6)}$$

Also, by solving Vs by using Equation 4, the voltages occurring at both ends of capacitor C2 can be expressed. Explanations will be given for the setting of the inductance value of the primary side of transformer T2.

When inductance value Lp2 of the primary side of transformer T2 is too high, it is not possible to regenerate, to a load, the surge energy accumulated in capacitor C2 within cycle T. The waveform depicted as ISW3 (NG) in FIG. 11 represents that it is not possible to regenerate the energy to the load within cycle T. Accordingly, the resonance cycle determined by inductance value Lp2 on the primary side of transformer T2 and capacitor C2 is set to be smaller than (cycle T—the ON time of switching element SW2). Inductance value Lp2 on the primary side of transformer T2 can be determined in accordance with Equation 7 by using t(SW2-ON-Delay) and t(SW2-OFF-Shadan).

$$Lp2 < \frac{(T - t(SW2\text{-}OFF\text{-}Shadan) - t(SW2\text{-}ON\text{-}Delay))^2}{4\pi^2 C2} \quad \text{(Equation 7)}$$

In step S5, the control unit 21 obtains from SW information 91 data used for controlling switching element SW3. In the example illustrated in FIG. 8, data is obtained with the waveform of the computation time being in an ON state. "Data used for controlling switching element SW3" used in the present example is data associated with "starting time of SW2", "driving period of SW2", "dead time 1 of SW3", and "dead time 2 of SW3". "Dead time 1 of SW3" is provided before the turn-on period of switching element SW2. In the example of FIG. 11, dead time 1 of switching element SW3 is depicted in the period of d1. Also, "d1" is recorded in "dead time 1 of SW3". "Dead time 2 of SW3" is set after the turn-off period of switching element SW2. In the example of FIG. 11, dead time 2 of switching element SW3 is depicted in the period of d2. Also, "d2" is recorded in "dead time 2 of SW3" in FIG. 9.

In step S6, the control unit 21 obtains the starting time of switching element SW3 (the off time of the third switching element) and the driving period (the on time of the second switching element). The starting time of switching element SW3 is obtained by using data of "starting time of SW2" and "dead time 1 of SW3". In the example illustrated in FIG. 11, timing t2−t1, which is earlier than the dead time d1, is obtained from timing t3. Thereafter, calculation data "t2−t1" obtained above is recorded as "starting time of SW3" in SW information 91 in FIG. 9.

The driving period of switching element SW3 is obtained by using data of "driving period of SW2" and "dead time 2 of SW3". In the example illustrated in FIG. 11, timing t6−t1, which is later than dead time d2, is obtained from timing t5. Thereafter, calculation data "t6−t1" obtained above is recorded as "driving period of SW3" in SW information 91 in FIG. 9.

In step S7, the control unit 21 generates respective control signals of SW1 through SW3, and outputs them from the driving unit. According to embodiment 1, the energy of a surge occurring in a switching element by the leakage inductor of a transformer provided in an insulation-type PFC circuit is regenerated to a load on the output side. Also, a surge in a switching element is suppressed so as to improve efficiency (input power/output power).

Also, because a surge is suppressed so as to decrease the surge voltage, the necessity of using high-voltage switching element SW1 (an FET or the like) is eliminated.

Also, when a switching element is an FET, a high-voltage FET has a high ON resistance, increasing losses so as to decrease circuit efficiency. However, a low-voltage FET is used, decreasing the resistance, and accordingly losses are reduced to improve circuit efficiency. Also, costs can be decreased compared with high-voltage FETs.

Insulation-type PFC circuits is limited to being low power (at most 100 W for example), while a high-power PFC circuit can also be used as a insulation type.

Also, a snubber circuit is used for suppressing a surge voltage in conventional insulation-type PFC circuits, and power loss (reduction in circuit efficiency) occurs in a resistor in an RC snubber. By contrast, by applying the circuit of embodiment 1, power loss can be reduced because the energy of a surge can be regenerated to the secondary side.

Note that outputs can be insulated against AC power supply lines.

Explanations will be given for embodiment 2.

By obtaining a power supply for controlling from the secondary side of transformer T2, embodiment 2 efficiently utilizes regenerated energy, and promotes an early convergence of a resonance current of transformer T2. Also, because an early convergence of a resonance current is achieved in transformer T2, the switching cycle of switching element SW1 can be shortened, making it possible to achieve higher frequencies.

Figure 12:
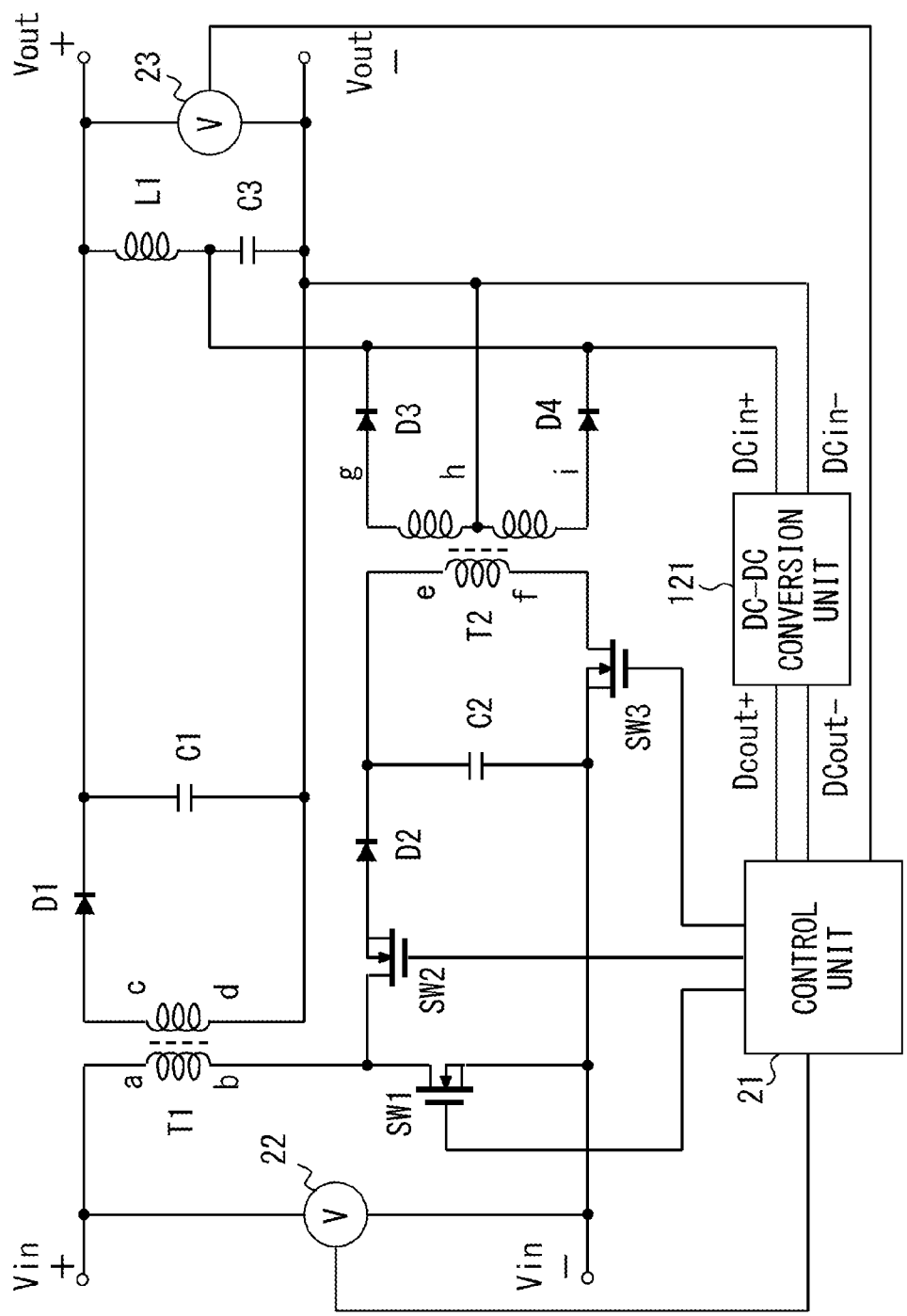
FIG. 12 illustrates an example of a PFC circuit according to embodiment 2.

FIG. 12 illustrates an example of a PFC circuit according to embodiment 2. The configuration illustrated in FIG. 12 is different from that of embodiment 1 in that it has a DC input/DC output power supply (DC-DC conversion unit) 121 provided as a power-supply unit for driving the control unit 21. The DC-DC conversion unit 121 uses a voltage output from the PFC circuit 3 so as to supply driving power to the control unit 21. In FIG. 12, input terminal DCin+ of the DC-DC conversion unit 121 is connected to the cathode terminals of diodes D3 and D4. Input terminal DCin− is connected to an h point (midpoint) of transformer T2. Output terminal DCout+ of the DC-DC conversion unit 121 is connected to the positive side of the power supply of the control unit 21, and output terminal DCout− is connected to the negative side of the power supply of the control unit 21.

Figure 13:
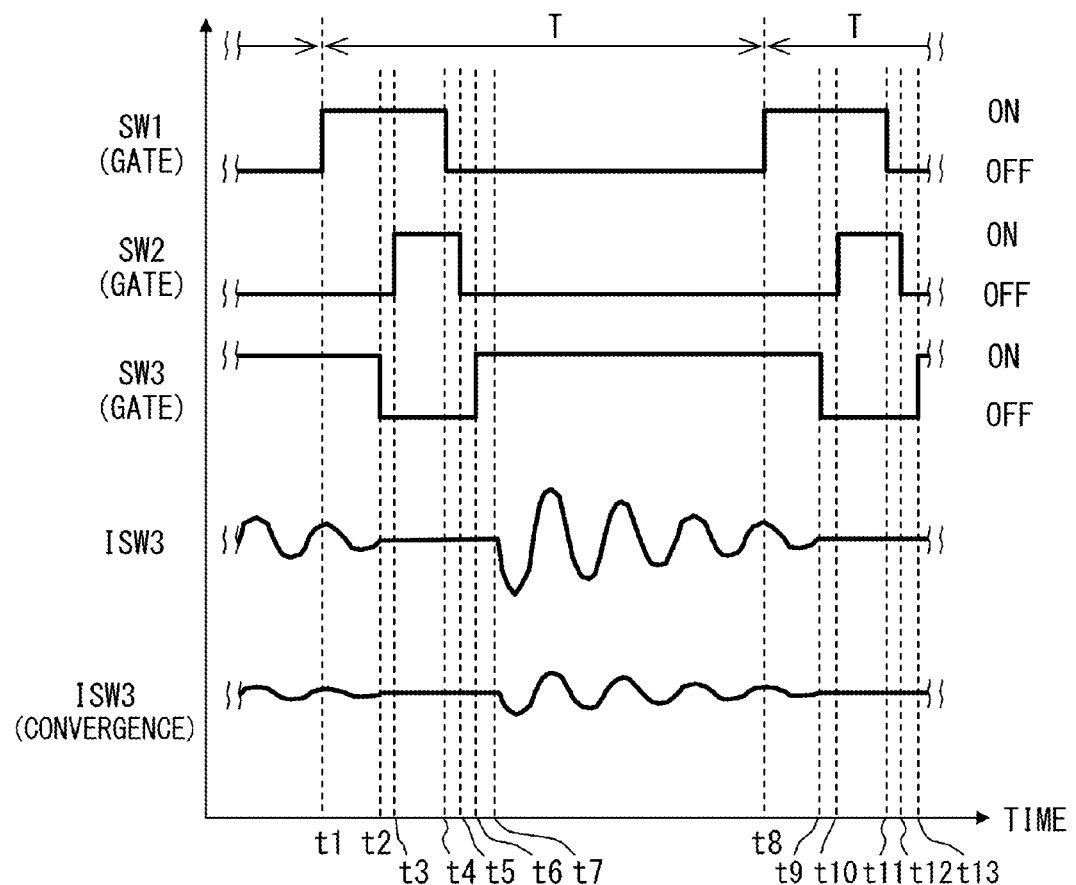
FIG. 13 illustrates an example of operation waveforms of respective units of the PFC circuit.

FIG. 13 illustrates an example of the convergence of a resonance current caused when embodiment 2 is applied to the PFC circuit. ISW3 (convergence) in FIG. 13 represents a waveform of a resonance current occurring when the DC-DC conversion unit 121 is provided. ISW3 (convergence) converges earlier than current ISW3 of the circuit of embodiment 1. This is because the DC-DC conversion unit 121 consumes power.

According to embodiment 2, it is possible to use energy of a regenerated surge as power for the control unit 21, to make a resonance of the regeneration circuit converge earlier, and thereby to set the switching frequency of switching element SW1 to a high value.

According to embodiment 2, it is also possible to provide a circuit for transmitting the energy of a surge caused in a switching element by a leakage inductor of a transformer to the primary side for regenerating the energy of a surge, and to suppress the surge in a switching element so as to improve efficiency.

Also, the surge voltage can be reduced by suppressing a surge, eliminating the necessity of using the high-voltage switching element SW1 (FET or the like). Also, when a switching element is an FET, the ON resistance of a high-voltage FET is high, increasing losses to deteriorate the circuit efficiency. However, because a low-voltage FET is used, the resistance is reduced, reducing losses so as to improve the circuit efficiency. Also, cost can be reduced compared with a case of a high-voltage FET.

Insulation-type PFC circuits only have outputs limited to low voltages (at most 100 W for example); however, even an insulation high power PFC circuit can be used.

Also, a snubber circuit is used for suppressing a surge voltage in a conventional insulation-type PFC circuit; however, in an RC snubber, power losses occur with respect to resistors (reduction in circuit efficiency). By contrast, by applying the circuit of embodiment 1, the energy of a surge can be regenerated to the secondary side, reducing power losses.

Note that outputs can be insulated against AC power supply lines.

Explanations will be given for embodiment 3.

When a switching element SW1 is used for performing switching at high speeds, there is a problem when the values of switching element SW2, diode D2, and series inductance Lh2 are greater than the parasitic inductance Lh1 of switching element SW1. It may be possible to use a Gallium Nitride High Electron Mobility Transistor (GaN-HEMT) as switching element SW1 for performing high-speed switching.

Figure 14:
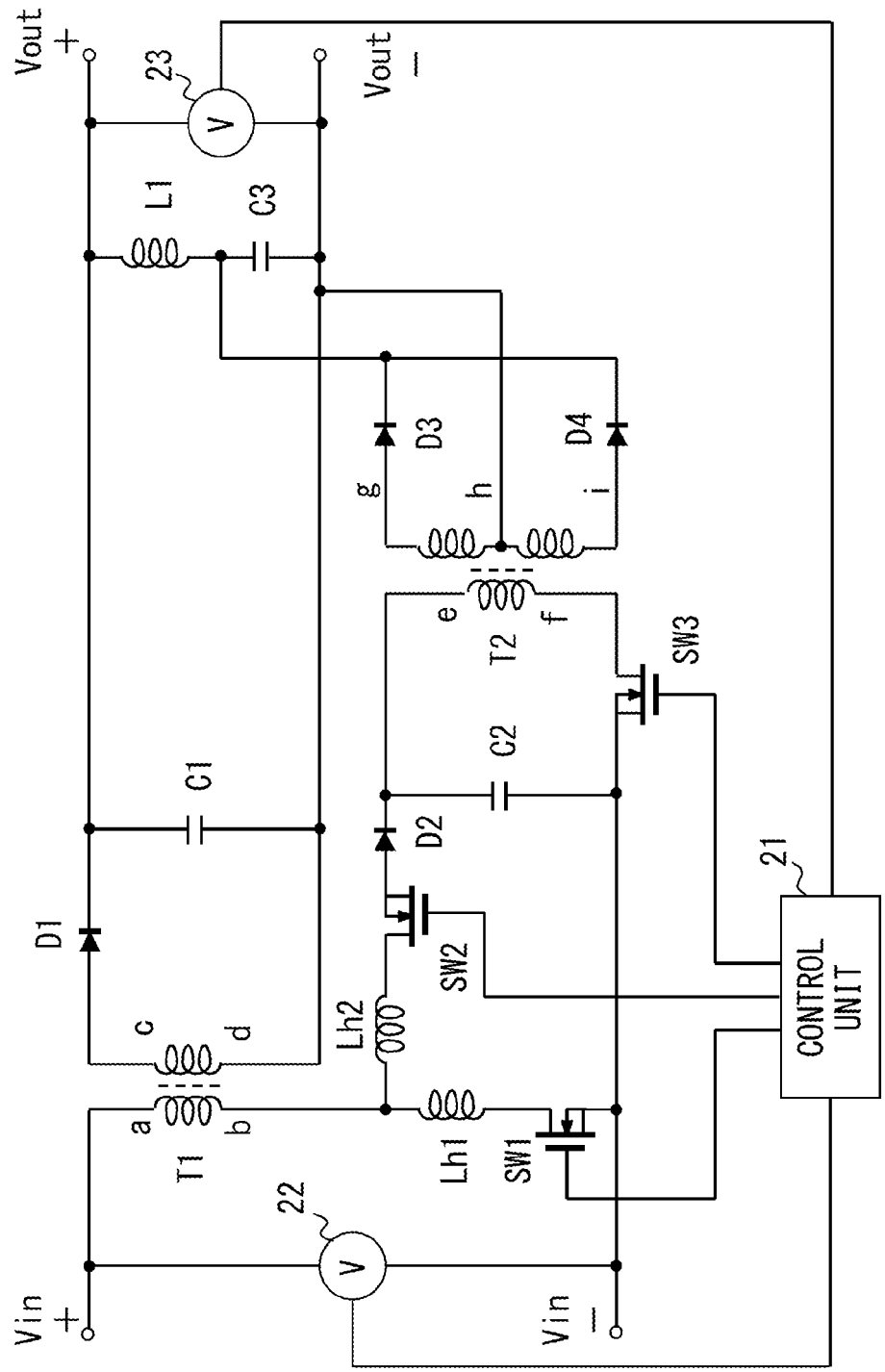
FIG. 14 illustrates an example of a PFC circuit according to embodiment 3.

FIG. 14 illustrates positions of series parasitic inductance Lh1 and series inductance Lh2. For simplicity, FIG. 14 illustrates parasitic inductance Lh1 and Lh2; however, no parasitic inductance actually exists as a coil as illustrated in FIG. 14. Currents of switching element SW1 have to be moved instantly to the circuit of switching element SW2, diode D2, and the capacitor C2 when high-speed switching is performed by using switching element SW1. However, when parasitic inductance Lh1 is greater than parasitic inductance Lh2, it is not possible to suppress an increase in the voltage between both ends of switching element SW1. Accordingly, it is necessary to make the values of switching element SW2, diode D2, and parasitic inductance Lh2 of capacitor C2 smaller than parasitic inductance Lh1 of switching element SW1. In other words, the component of the parasitic inductance is made to meet the condition Lh1≥Lh2. As a method of meeting the condition Lh1≥Lh2, there is a method in which the condition is met by processing wires. Processing of wires may include changes in the length of wires, the width of wires, the thickness of wires, and the material of wires.

Embodiment 3 can realize switching element SW1 that performs high-speed switching.

Note that the scope of the present invention is not limited to the above embodiments, and allows various alterations and modifications without departing from the spirit of the invention. Also, the respective embodiments may be combined without causing contradictions in processing.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relates to a showing of the superiority and inferiority of the invention. Although the embodiment of the present inventions has been described in detail, it should be understood that the various changes, substitutions, and alterations could be made hereto without departing from the spirit and scope of the invention.

What is claimed is:

1. An insulation-type power factor correction circuit including a first switching element that is connected in series to a primary winding of a first transformer, a control unit that corrects a power factor by performing on/off control on the first switching element in each cycle, and a circuit that rectifies and smoothes a current transmitted from the primary winding to the secondary winding of the first transformer, comprising:

a resonance unit that includes a first capacitor that accumulates energy of a surge occurring when the first switching element is turned off, a second switching element provided between the primary winding of the first transformer and the first capacitor, and a second transformer connected in parallel to the first capacitor, and that is connected in parallel to the first switching element;

a rectifier unit configured to rectify the resonance current output from the resonance unit; and a smoothing unit configured to regenerate power, which is output from the rectifier unit, to an output of the insulation-type power factor correction circuit, wherein the control unit performs in each of the cycles control of connecting the primary winding of the first transformer by turning on the second switching element at a time before the first switching element is turned off when energy of a surge occurring when the first switching element is turned off is accumulated in the first capacitor, and performs in each of the cycles control of turning off the second switching element at a time after the first switching element is turned off so as to cause the resonance current by resonating the primary winding of the second transformer and the first capacitor, transmitting the energy accumulated in the first capacitor from the primary winding of the second transformer to the secondary winding, and to making the rectifier unit output the energy.

2. The insulation-type power factor correction circuit according to claim 1, wherein:

the resonance unit includes one terminal of the first switching element connected to one terminal of the second switching element, another terminal of the second switching element connected to an anode terminal of a first diode, a cathode terminal of the first diode connected to another terminal of the primary winding of the second transformer and another terminal of the first capacitor, another terminal of the primary winding of the second transformer connected to another terminal of a third switching element, and another terminal of the first capacitor connected to another terminal of the first switching element and another terminal of the third switching element, and the control unit obtains a second-switching-element-on time, which is a time earlier than a time of outputting a first control signal that turns off the first switching element, which is a delay time of turning on the second switching element as an earlier time, and which is a time of turning off the second switching element, obtains a second-switching-element-off time, which is a time later than a time of outputting the first control signal, which is a blockage time at which transfer of the energy of leakage inductor of the first transformer to the first capacitor is completed, and which is a time of turning off the second control signal is obtained; and reflects the second-switching-element-on time and the second-switching-element-off time are reflected in control of the second switching element in a next cycle.

3. The insulation-type power factor correction circuit according to claim 2, wherein:

a capacitance value of the first capacitor is a value obtained by dividing a square of a peak current value on a primary side of the first transformer by a square of a maximum value of the surge, and by multiplying an inductance value of the leakage inductor by the divisional value.

4. The insulation-type power factor correction circuit according to claim 3, wherein:

a ratio between a number of wires on a secondary side of the second transformer and a number of wires on a primary side of the second transformer is greater than a ratio between a number of wires on a secondary side of the first transformer and a number of wires on a primary side of the first transformer.

5. The insulation-type power factor correction circuit according to claim 4, wherein:

an inductance value on a primary side of the second transformer is a value to regenerate the energy accumulated in the first capacitor to a load before the second-switching-element-on time in a next cycle.

6. The insulation-type power factor correction circuit according to claim 2, wherein:

the rectifier unit includes one terminal of secondary winding of the second transformer connected to an anode terminal of a second diode, another terminal of secondary winding of the second transformer connected to an anode terminal of a third diode, one terminal of the smoothing unit to which an inductor and a second capacitor are connected in series connected to one terminal of an output terminal of the insulation-type power factor correction circuit, another terminal of the smoothing unit connected to another terminal of an output terminal of the insulation-type power factor correction circuit, the cathode terminals of the second and the third diodes connected to the inductor and the second capacitor of the smoothing unit at a connection point between the inductor and the second capacitor, and another terminal of the smoothing unit connected to the secondary winding of the second transformer at a midpoint of secondary winding of the second transformer, and the rectifier unit includes a power-supply unit which supplies power to drive the control unit by using output power of the rectifier unit.

7. The insulation-type power factor correction circuit according to claim 2, wherein:

the control unit obtains a third-switching-element-off time of outputting a control signal that turns off the third switching element at a time earlier than the second-switching-element-on time by using a first dead time of the third switching element, obtains a third-switching-element-on time of outputting a control signal that turns on the third switching element at a time later than the second-switching-element-off time by using a second dead time of the third switching element, and reflects the third-switching-element-off time and the third-switching-element-on time in control of the third switching element in a next cycle.

8. The insulation-type power factor correction circuit according to claim 1, wherein:

circuit wiring is performed in such a manner that a series inductance value between the second switching element, the first diode, and the first capacitor is smaller than a series parasitic inductance value of the first switching element.

* * * * *